(12) United States Patent
Han et al.

(10) Patent No.: US 9,743,305 B2
(45) Date of Patent: Aug. 22, 2017

(54) FAST SMALL CELL DISCOVERY

(71) Applicant: Intel IP Corporation, Santa Clara, CA (US)

(72) Inventors: Seunghee Han, Kyoungkido (KR); Youn Hyoung Heo, Seoul (KR); Jong-Kae Fwu, Sunnyvale, CA (US); Alexei Davydov, Nizhny Novgorod (RU)

(73) Assignee: Intel IP Corporation, Santa Clara, CA (US)

( * ) Notice: Subject to any disclaimer, the term of this patent is extended or adjusted under 35 U.S.C. 154(b) by 192 days.

(21) Appl. No.: 14/127,479

(22) PCT Filed: Sep. 6, 2013

(86) PCT No.: PCT/US2013/058579
§ 371 (c)(1),
(2) Date: Dec. 18, 2013

(87) PCT Pub. No.: WO2014/113075
PCT Pub. Date: Jul. 24, 2014

(65) Prior Publication Data
US 2014/0198676 A1    Jul. 17, 2014

Related U.S. Application Data

(60) Provisional application No. 61/753,914, filed on Jan. 17, 2013.

(51) Int. Cl.
*H04W 24/10* (2009.01)
(52) U.S. Cl.
CPC .................................. *H04W 24/10* (2013.01)

(58) Field of Classification Search
None
See application file for complete search history.

(56) References Cited

U.S. PATENT DOCUMENTS

| 2006/0165188 A1 | 7/2006 | Wunder et al. |
| 2008/0095185 A1* | 4/2008 | DiGirolamo .......... H04L 1/0026 370/464 |

(Continued)

FOREIGN PATENT DOCUMENTS

| EP | 0625863 B1 | 6/2001 |
| EP | 1562396 A2 | 8/2005 |
| WO | 2011139091 A2 | 11/2011 |

OTHER PUBLICATIONS

International Search Report for PCT Application No. PCT/US2013/058579 dated Dec. 17, 2013, 12 pages.

*Primary Examiner* — Faruk Hamza
*Assistant Examiner* — Cassandra Decker
(74) *Attorney, Agent, or Firm* — Schwabe, Williamson & Wyatt, P.C.

(57) ABSTRACT

Embodiments of circuitry to be included in a user equipment ("UE") and an evolved Node B ("eNB") are described. To accelerate the detection of one or more cells in a wireless network, a UE may perform Radio Resource Management ("RRM") measurements based on one or more synchronization signals instead of based on a common reference signal ("CRS"). Alternatively, the UE may perform RRM measurements for a cell based on a CRS transmitted for the cell without synchronizing to the cell using one or more synchronization signals. The UE may report the RRM measurements to an eNB that is to serve the UE.

19 Claims, 9 Drawing Sheets

(56) References Cited

U.S. PATENT DOCUMENTS

| | | | |
|---|---|---|---|
| 2010/0309797 A1* | 12/2010 | Lindoff | H04B 17/318 370/252 |
| 2011/0206011 A1* | 8/2011 | Ishida | H04W 36/0083 370/331 |
| 2012/0087264 A1 | 4/2012 | Lindoff et al. | |
| 2012/0244903 A1* | 9/2012 | Fong | H04W 8/20 455/517 |
| 2012/0307670 A1* | 12/2012 | Kazmi | H04W 24/10 370/252 |
| 2013/0083744 A1* | 4/2013 | Peng | H04W 52/04 370/329 |
| 2013/0196659 A1* | 8/2013 | Damji | H04W 52/0225 455/434 |
| 2013/0273912 A1* | 10/2013 | Xu | H04W 24/08 455/434 |
| 2015/0003348 A1* | 1/2015 | Ishii | H04L 27/2601 370/329 |

\* cited by examiner

FAST SMALL CELL DISCOVERY

CROSS REFERENCE TO RELATED APPLICATIONS

The present application is a national phase entry under 35 U.S.C. §371 of International Application No. PCT/US2013/058579, filed Sep. 6, 2013, entitled "FAST SMALL CELL DISCOVERY", which designates the United States of America, and which claims priority to U.S. Provisional Patent Application No. 61/753,914, filed Jan. 17, 2013, entitled "Advanced Wireless Communication Systems and Techniques," the entire disclosure of which is hereby incorporated by reference in its entirety.

FIELD OF INVENTION

Embodiments described herein relate generally to the technical field of data processing, and more particularly, to wireless networks provided by cells to user equipment.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by the inclusion in this section.

To manage increased traffic on mobile networks, some mobile network traffic can be accommodated through the use of small cells. A small cell is typically provided through a low-powered radio access node that operates in licensed and unlicensed spectrums. These low-powered radio access nodes have a transmission power that is less than that of a macro node or other high-powered cellular base station. For example, the range of such low-powered radio access nodes is often between ten (10) meters to two (2) kilometers, whereas the range of a macro node might be several tens of kilometers.

The low-powered radio access nodes that are to provide small cells may be embodied in a number of different systems. A common low-powered radio access node is a femtocell cellular base station. A femtocell connects to a service provider's network through a broadband connection (e.g., cable or digital subscriber line), thereby allowing that service provider to extend service coverage indoors or at a cell edge where network access might otherwise be limited. Other common small cells include, among others, picocells and microcells. In order to realize the increased service coverage and/or network capacity provided by a small cell, a user equipment ("UE") operating on the network may be served by that small cell.

BRIEF DESCRIPTION OF THE DRAWINGS

The embodiments described herein are illustrated by way of example and not by way of limitation in the figures of the accompanying drawings in which like references indicate similar elements. It should be noted that references to "an" or "one" embodiment in this disclosure are not necessarily to the same embodiment, and they mean at least one.

DETAILED DESCRIPTION

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A or "B" and "A and/or B" mean (A), (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the terms "module" and/or "logic" may refer to, be part of, or include an Application Specific Integrated Circuit ("ASIC"), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
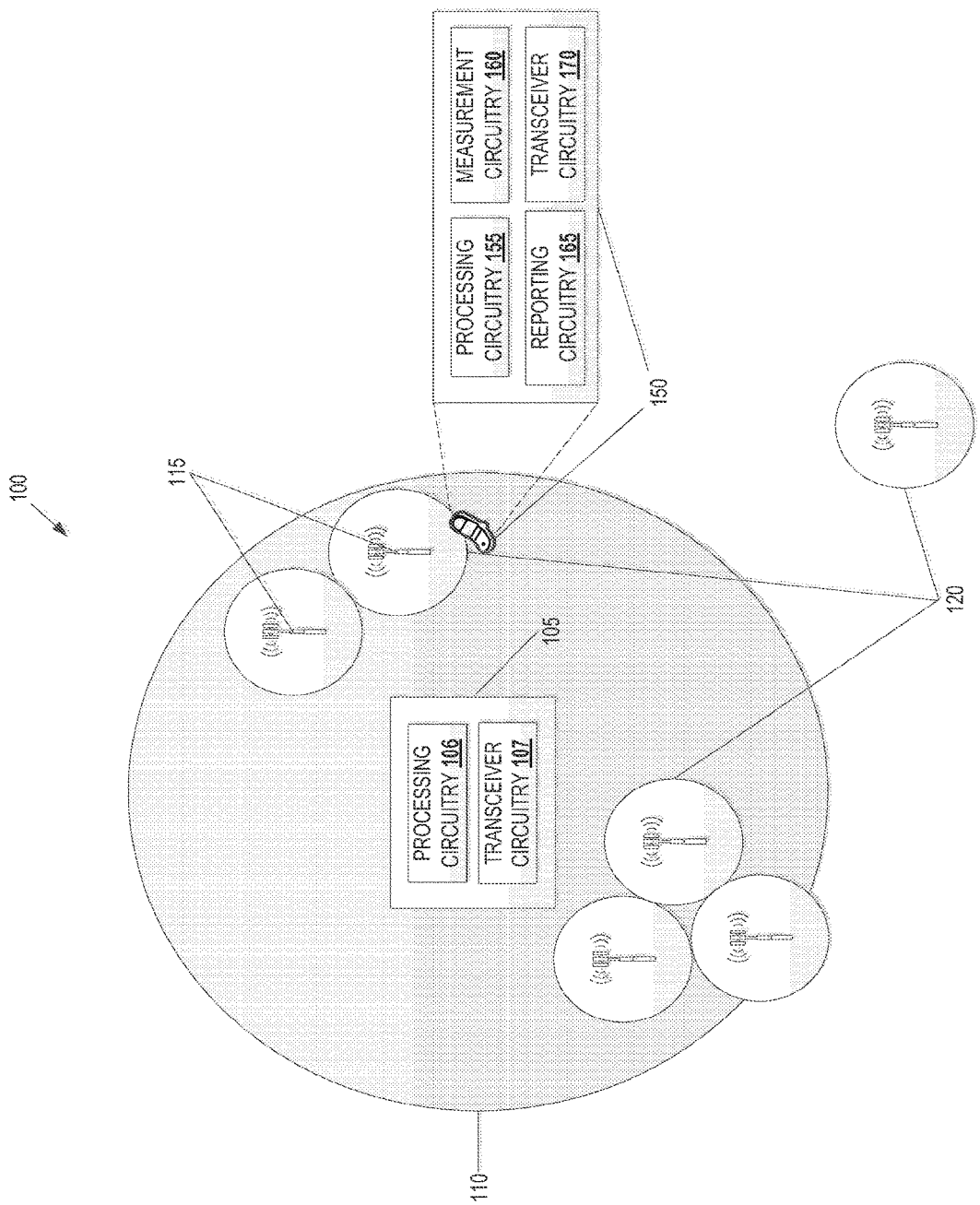
FIG. 1 is an exemplary wireless communication network, according to one embodiment.

FIG. 1 illustrates an exemplary wireless communication network 100, according to one embodiment. The wireless communication network 100 (hereinafter "network 100") may be an access network of a 3rd Generation Partnership Project ("3GPP") long-term evolution ("LTE") network such as evolved universal mobile telecommunication system ("UMTS") terrestrial radio access network ("E-UTRAN"). The network 100 features, among other elements, a relatively high-power base station, such as an evolved Node B ("eNB") 105, that is to provide a wireless macro cell 110. This wireless macro cell 110 provided by the eNB 105 may operate on a first frequency F1.

To serve a user equipment ("UE") 150 and otherwise administrate and/or manage wireless communication in the network 100, the eNB 105 may include processing circuitry 106 and transceiver circuitry 107. The processing circuitry 106 may be adapted to perform various tasks in the network 100, including, but not limited to, providing a wireless cell that is to serve the UE 150, determining Radio Resource Management ("RRM") metrics that are to be measured and threshold values for those metrics, and processing data received from the UE 150, such as cell identities (e.g., physical layer cell identities and/or global cell identities) and associated RRM measurements. The transceiver circuitry 107 may be adapted to transmit data, such as requests and/or configuration information, to the UE 150 and/or a node 115 and receive data (e.g., responses) therefrom.

In the network 100, the UE 150 is to connect with the eNB 105 where the UE is within the wireless macro cell 110. The UE 150 may be any device adapted to connect with the eNB 105 according to, for example, the 3GPP specification, such as a hand-held telephone, a laptop computer, or other similar device equipped with a mobile broadband adapter. According to some embodiments, the UE 150 may be adapted to administrate one or more tasks in the network 100, including mobility management, call control, session management, and identity management.

To process data, communicate with the eNB 105 and/or the nodes 115, or otherwise function in the network 100, the UE 150 may include, but is not limited to, processing circuitry 155, measurement circuitry 165, reporting circuitry 160, and transceiver circuitry 170. The processing circuitry 155 may be adapted to perform a plurality of tasks for the UE 150, such as detecting physical signals (e.g., primary synchronization signals, secondary synchronization signals, and/or common reference signals) transmitted by one or both of the eNB 105 and the nodes 115, receiving and processing a list of neighboring cells (e.g., a list of cells 120 transmitted by the eNB 105), identifying the identities of one or more cells 110, 120 (e.g., a physical layer cell identity and/or a global cell identity), and/or performing RRM tasks. The measurement circuitry 160 may be adapted to perform RRM measurements using physical signals. The reporting circuitry may be adapted to report measured RRM results to, for example, the eNB 105. Finally, the transceiver circuitry 170 may be adapted to send data to and receive data from the eNB 105, a node 115, or another data source/recipient.

Also included in the wireless network environment 100 is a plurality of low-powered radio access nodes 115. The plurality of low-powered radio access nodes 115 are to provide a plurality of small cells 120. According to the embodiment, the plurality of small cells 120 may be femtocells, picocells, microcells, or essentially any similar cell having a range of about less than two (2) kilometers ("km").

The small cells 120 may operate on a second frequency F2 that is different than the first frequency F1 (although the two frequencies may be the same in alternative embodiments). In this arrangement, the UE may be provided both macro-layer and local-node layer coverage. With the benefit of such coverage, the bandwidth and/or network reliability (e.g., near the edge of macro cell 110) may be increased for the UE 150 through such as data offloading, carrier aggregation, and other similar technologies. In the illustrated embodiment, the range of the macro cell 110 may be insufficient to reach each small cell 120 of the plurality, and therefore not all of the plurality of small cells 120 have macro-layer coverage.

Figure 2:
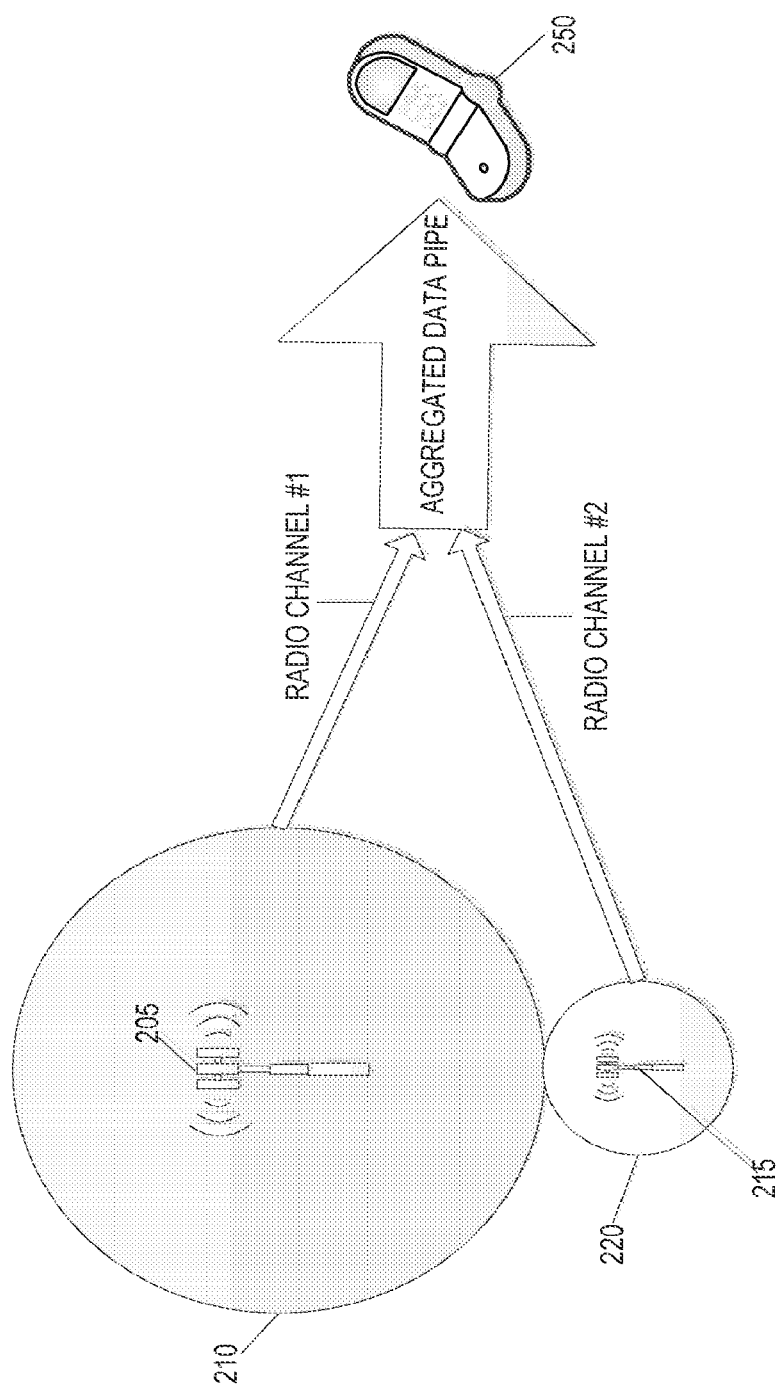
FIG. 2 is a conceptual block diagram depicting carrier aggregation, according to one embodiment.

Turning now to FIG. 2, a conceptual block diagram depicting carrier aggregation is shown. Carrier aggregation offers one technique for increasing bandwidth available to a UE 250 (which may be one embodiment of the UE 150). In carrier aggregation, multiple spectrum allocations are aggregated to increase data throughput in channels, e.g., downlink transmission bandwidth may be up to 100 megahertz ("MHz"). For a UE having carrier aggregation capability, the UE may transmit and/or receive data by aggregating the MHz available to the UE from multiple eNBs and/or nodes.

In the illustrated embodiment, the UE 250 (adapted for carrier aggregation) is served by two cells: (1) an eNB 205 (e.g., the eNB 105) and (2) a low-powered radio access node 215 (e.g., a low-powered radio access node 115). Both the eNB 205 and the node 215 are to provide respective cells 210, 220 to the UE 250. However, eNB 205 may provide a macro cell 210 that operates on a first frequency F1, whereas the node 215 may provide a small cell 220 that operates on a second frequency F2. The two cells 210, 220 operating on two frequencies F1, F2 may provide the UE 250 with an aggregated frequency bandwidth that exceeds the bandwidth available from an individual cell 210, 220. Here, the macro cell 210 offers twenty (20) MHz of bandwidth and the small cell 220 offers five (5) MHz of bandwidth for a total aggregated bandwidth of twenty-five (25) MHz. In other embodiments, additional cells (that may be similar to the macro cell 210 and/or the small cell 220) may be included in the carrier aggregation system so that a greater total bandwidth is achieved (e.g., approximately 100 MHz). Thus, FIG. 2 is to be regarded as illustrative and not limiting.

In the carrier aggregation illustration of FIG. 2, the two serving cells 210, 220 may be categorized according to their roles in the carrier aggregation scheme. As shown, the macro cell 210 is adapted to act as a primary cell ("PCell") for carrier aggregation, while the small cell 220 is adapted to act as a secondary cell ("SCell"). The PCell 210 is the cell upon which the UE 250 performs initial connection establishment (although it may be changed during handover). The SCell 220, however, is adapted to provide additional radio resources after the UE 250 connects with the PCell 210. In alternative embodiments, the roles may be reversed such that the small cell 220 acts as the PCell and the macro cell 210 provides the SCell. Further, other cells (e.g., macro cells and/or small cells) may be included as additional SCells (although there is generally only one PCell serving a UE).

Figure 3:
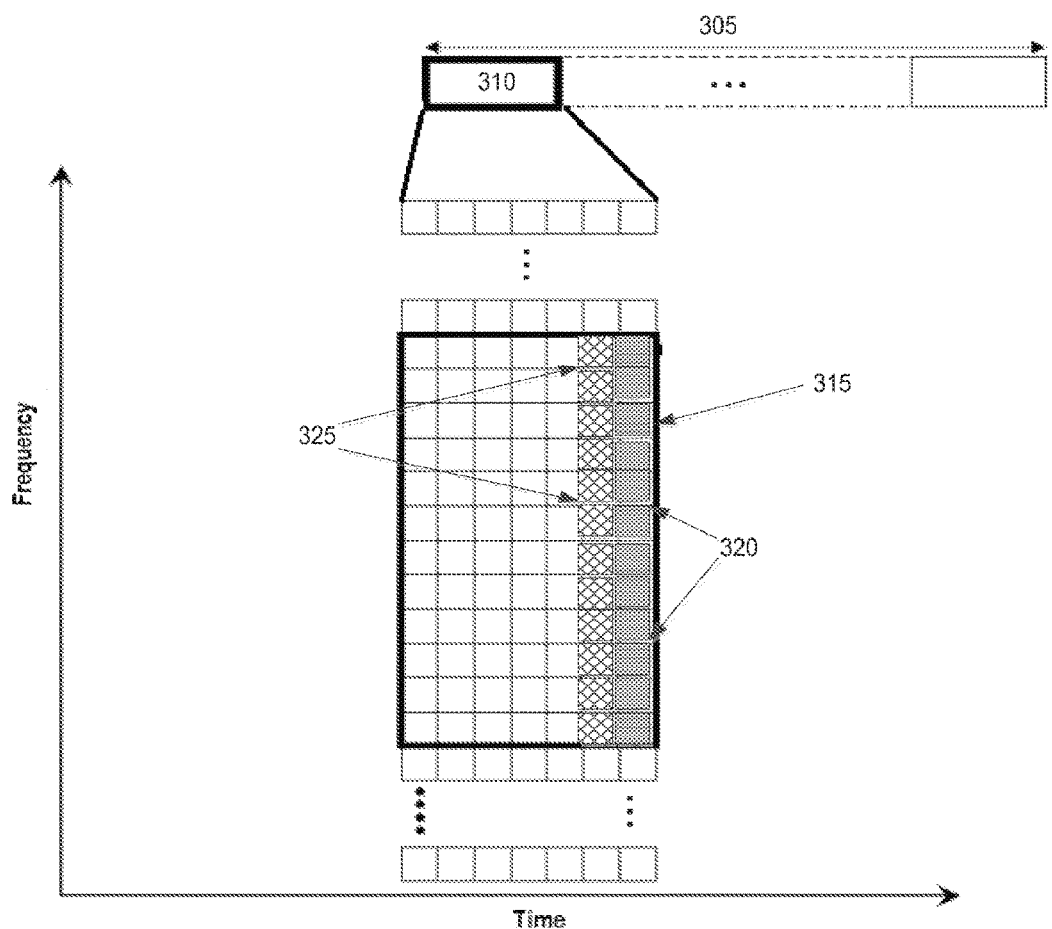
FIG. 3 is a block diagram of one embodiment of a radio frame and its constituent components, according to one embodiment.

Communication between a UE (e.g., the UE 150) and an eNB/node (e.g., eNB 105 and/or node 115) may rely on radio frames. A simple embodiment of a radio frame 305 is illustrated in FIG. 3. The radio frame 305, which may be transmitted as one of a plurality, is composed of subframes, each subframe having a plurality of slots 310 (e.g., two). A resource block 315 may comprise one slot 310 in the time domain and a plurality of subcarriers (e.g., twelve subcarriers) in the frequency domain.

Included in a resource block 315 of a slot 310 are two physical signals: a primary synchronization signal ("PSS") 320 and (2) a secondary synchronization signal ("SSS") 325. The PSS 320 and the SSS 325 may be broadcast twice in each frame 305; however, the PSS 320 may be the same in each frame 305, whereas the SSS 325 may be different so the UE can detect which is first and which is second. The UE may use the PSS 320 and SSS 325 in combination to deduce a Physical layer Cell Identity ("PCI") of a cell transmitting the radio frame 305.

Figure 4:
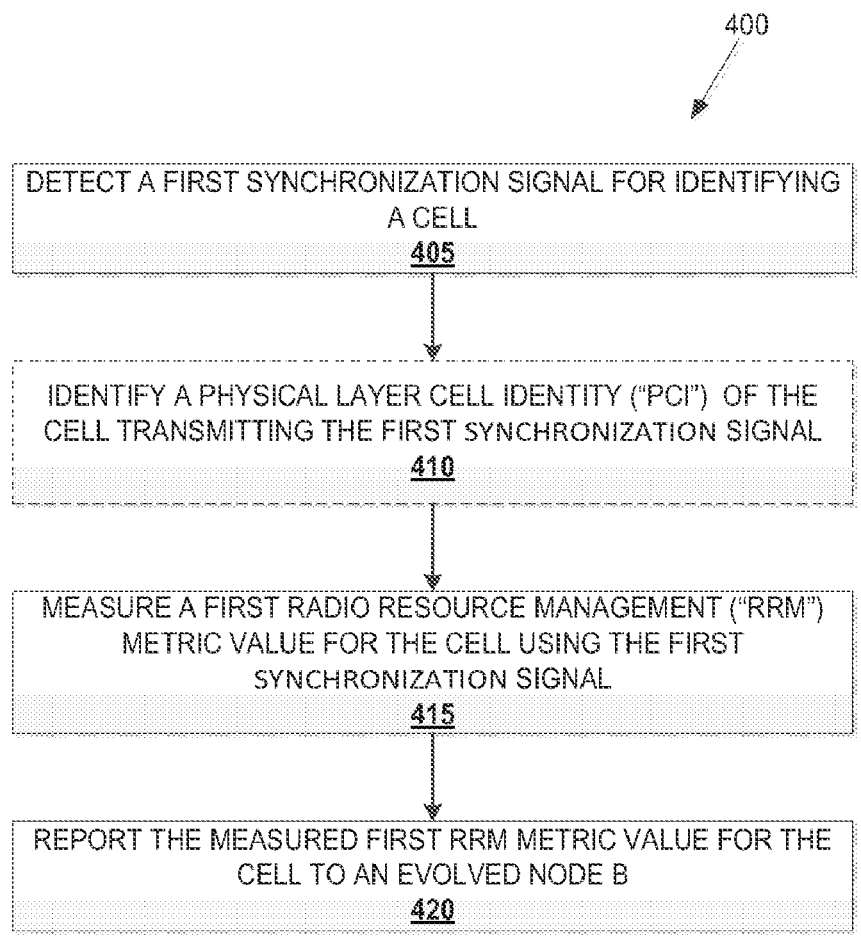
FIG. 4 is a flow diagram depicting a method for radio resource management measurement and reporting from a UE, according to one embodiment.

Now with reference to FIG. 4, a flow diagram depicts a method 400 for radio resource management measurement and reporting from a UE. The method 400 may be performed by a UE, such as the UE 150 in the network 100 shown in FIG. 1. While FIG. 4 illustrates a plurality of sequential operations, one of ordinary skill would understand that one or more operations of the method 400 may be transposed and/or performed contemporaneously. The method 400 may be performed in a wireless network environment by a UE adapted for carrier aggregation to identify a satisfactory small cell that is to serve the UE as an SCell. Accordingly, the UE may already be served by a PCell, such as a PCell provided by an cNB, when the UE performs the method 400. In another embodiment, the method 400 may be performed for handover between cells.

Beginning first with operation 405, the method 400 may include detecting a first synchronization signal for identifying a cell (e.g., a macro cell or a small cell). The first synchronization signal may be broadcast by the cell in the downlink direction. Where the UE is within the coverage area of the cell, the UE may scan the frequency spectrum and tune transceiver circuitry of the UE to a frequency (or band) at which a plurality of radio frames are being transmitted. At that frequency, the UE begins cell synchronization using a PSS by, for example, examining the last orthogonal frequency-division multiplexing ("OFDM") symbol of the first slot of the first subframe of a radio frame transmitted by the cell. After initiating this cell synchronization, the UE may examine the SSS of a transmitted radio frame, which may be transmitted in the symbol before the PSS.

At the next operation 410, the UE is adapted to identify the PCI of the cell transmitting the synchronization signal(s). In many embodiments, the UE is adapted to identify the PCI of the cell using both the PSS and the SSS. This operation 410 may be transposed with the following operation 415 or omitted, depending upon the embodiment.

Proceeding to operation 415, the UE performs at least one measurement of a metric value. This measurement is to be performed for radio resource management ("RRM") so that radio transmission characteristics of the cell transmitting the synchronization signal can be observed. In embodiments described herein, however, the UE is adapted to measure the RRM metric value using at least one of the PSS and the SSS. In one embodiment, both the PSS and the SSS are used to measure the RRM metric value.

The RRM metric value measured using the PSS and/or the SSS may be measured at an antenna connector of the UE and may be related to one or both of signal power and signal quality. In one embodiment, the RRM metric is defined as the received (linear) average power of the resource element(s) that carry one or both of the PSS and SSS. This metric may be identified as "SCH_RP." In another embodiment, the RRM metric is defined as the signal to interference over thermal noise power. This other metric may be identified as "SCH Ês/Iot."

To measure an RRM metric value, the UE may sample a search window that is not equal to a single radio frame. Rather, the UE may base an RRM metric value measurement on one or more subframes having one or more resource blocks that carry the PSS and the SSS. Since PSS and SSS occupy two OFDM symbols in a subframe, the effective measurement may be based on two OFDM symbols within the subframe. Alternatively, the UE may use a larger sample by expanding the search window to include a plurality of radio frames—e.g., the UE may measure an RRM metric value from the PSS and/or SSS detected in the resource blocks across multiple radio frames transmitted by the same cell.

At next operation 420, the UE is adapted to transmit a measured RRM metric value. The UE may report one or more measured RRM metric value(s) to an eNB that is serving the UE. Further, the UE may be adapted to transmit the identified PCI corresponding to the cell for which the UE measured the RRM metric value. This eNB may be, for example, responsible for handover of the UE to another serving cell and/or providing a PCell in a carrier aggregation system. The RRM metric value that is to be measured and/or reported may be predetermined in the UE. In another embodiment, however, the RRM metric may be specified by, for example, an eNB (e.g., the serving eNB) in one or more resource element(s) transmitted to the UE in one or more radio frame(s).

In some embodiments, the UE may report one or more measured RRM metric value(s) in response to an event and/or at an interval (e.g., a predetermined interval). In one embodiment, the UE is to report a measured RRM metric value in response to determining a relationship of a measured RRM metric value to a threshold. For example, if the measured RRM metric value exceeds a threshold, then the UE may report the measured RRM metric value as a consequence of that relationship. In such embodiments, the threshold may be predetermined in the UE and/or may be received from an eNB.

Figure 5:
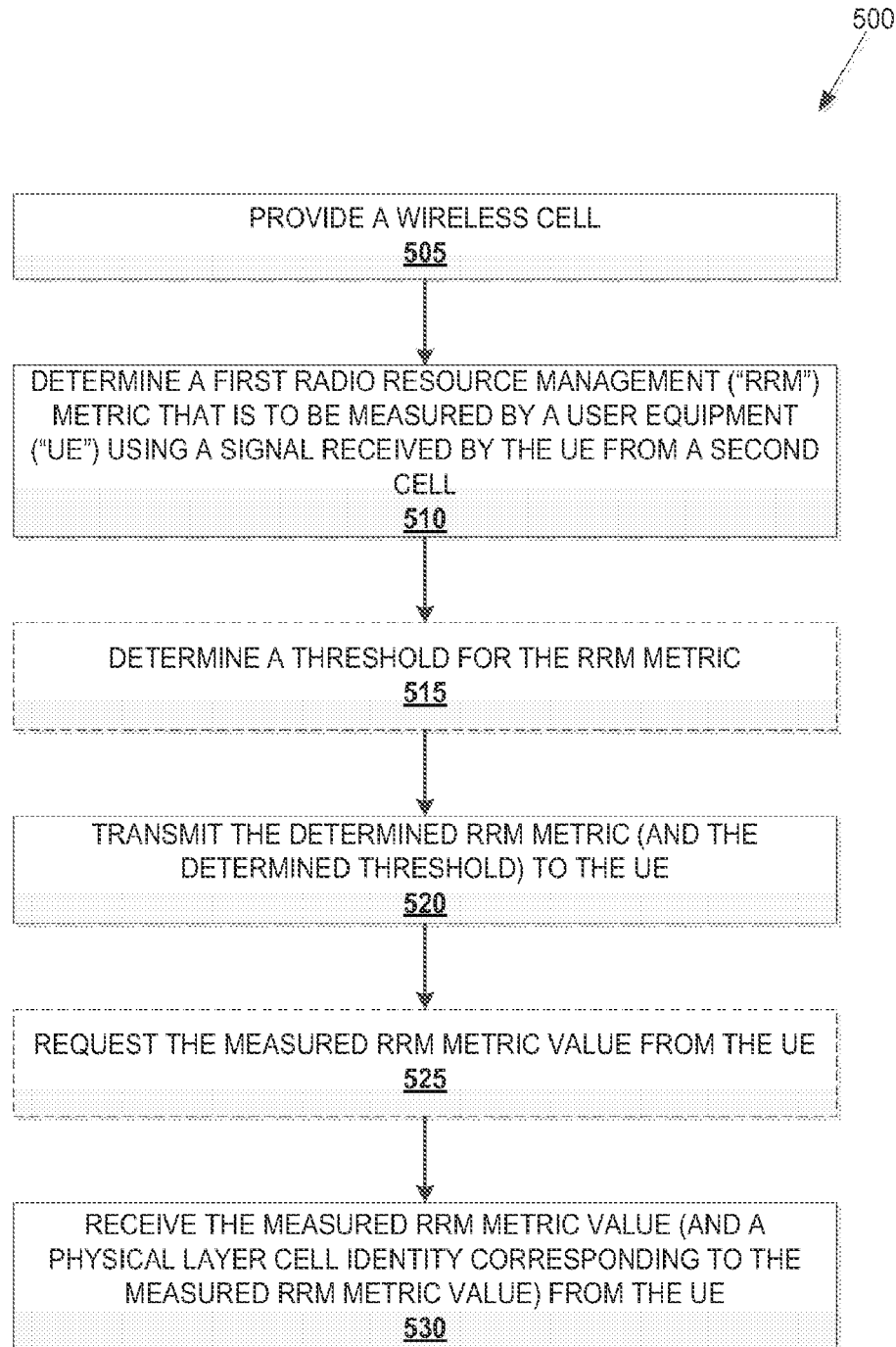
FIG. 5 is a flow diagram depicting a method for radio resource management measurement and receiving reports at an eNB, according to one embodiment.

With reference to FIG. 5, a flow diagram depicts a method 500 for radio resource management measurement and receiving reports at an eNB in accordance with some embodiments. The method 500 may be performed by an eNB, such as the eNB 105 in the network 100 shown in FIG. 1. While FIG. 5 illustrates a plurality of sequential operations, one of ordinary skill would understand that one or more operations of the method 500 may be transposed and/or performed contemporaneously. The method 500 may be performed in a wireless network environment by an eNB serving a UE that is adapted for carrier aggregation. Accordingly, the eNB may already be providing the UE with a PCell. In another embodiment, the method 500 may be performed for handover between cells.

Beginning first with operation 505, the eNB performing the method 500 is configured to provide a wireless cell that is to serve a UE in a wireless networking environment. For a UE that is adapted for carrier aggregation, the wireless cell provided by the eNB may be a PCell. In one embodiment, the eNB is adapted to administrate handover of the UE to a neighboring cell in the wireless networking environment.

To evaluate the suitability of another cell for carrier aggregation and/or handover, the eNB may require one or more RRM metric values to be reported thereto. Thus at operation 510, the eNB is adapted to determine at least one RRM metric related to another cell that the eNB is to receive from a UE. In one embodiment, the eNB is adapted to determine the RRM metric based on a carrier frequency. For example, in a carrier aggregation system, the eNB may determine the RRM metric that is to be measured for a secondary small cell operating on a frequency that is different from the primary cell provided by the eNB. In another embodiment, the eNB is adapted to determine the RRM metric based on a PCI. In even another embodiment, the RRM metric may be predetermined.

In one embodiment, the RRM metric is determined to be the received (linear) average power of the resource element(s) that carry one or both of the PSS and SSS ("SCH_RP"). In another embodiment, the RRM metric is determined to be the signal to interference over thermal noise power ("SCH Ês/Iot"). In even another embodiment, the RRM metric is determined to be the reference signal received power ("RSRP") and/or the reference signal received quality ("RSRQ"). The UE is adapted to measure the determined RRM metric value using a physical signal (e.g., a reference signal and/or a synchronization signal) received from the other cell. With this, the RRM measurement can be based only on a synchronization signal containing PSS and SSS while excluding common reference signal ("CRS").

Because the UE may report the measured RRM metric value based on an event, such as the reaching of a threshold, the eNB may be further adapted to determine such a threshold, as shown at operation 515. In some embodiments, this threshold is predetermined (e.g., a preconfigured constant) or may be absent. At operation 520, the eNB is to transmit the determined RRM metric(s) (and the threshold, if applicable) to the UE. The eNB may transmit the determined RRM metric(s) specifically to the UE (e.g., using beamforming). In other embodiments, however, the determined RRM metric(s) may be broadcast to a plurality of UEs that are being served by the eNB.

Subsequently, the UE is responsible for measuring the determined RRM metric value using one or more signal(s) received by the UE from another cell, such as a cell neighboring the UE or a cell suitable to provide increased bandwidth through carrier aggregation. The UE may then transmit a measured RRM metric value to the eNB, for example, at a predefined interval or in response to an event (e.g., a measured RRM metric value exceeding a threshold). In one embodiment, however, the eNB may need to request a measured RRM metric value from the UE. Thus, at operation 525, the eNB is adapted to transmit a request for a measured RRM metric value to the UE. The eNB can transmit such a request at a predetermined interval or, alternatively, in response to an event (e.g., an indication that the UE is approaching the edge of the coverage of the wireless cell).

According to the embodiment (e.g., in response to a request from the eNB or at a predetermined interval), the UE is adapted to transmit the measured RRM metric value to the eNB. Accordingly, operation 530 includes the eNB receiving the measured RRM metric value from the UE. This measured RRM metric value may be received from the UE in connection with a PCI that corresponds to the RRM metric value so that the eNB can perform some administration and/or management tasks (e.g., small cell management and/or cell handover). In one embodiment, the eNB may not receive an actual value, but rather may receive an indication that an RRM metric value exceeds a threshold (as measured by the UE). In such an embodiment, the eNB may be further adapted to transmit another request to the UE requesting the measured RRM metric value and receive the measured RRM metric value from the UE in response thereto.

Figure 6:
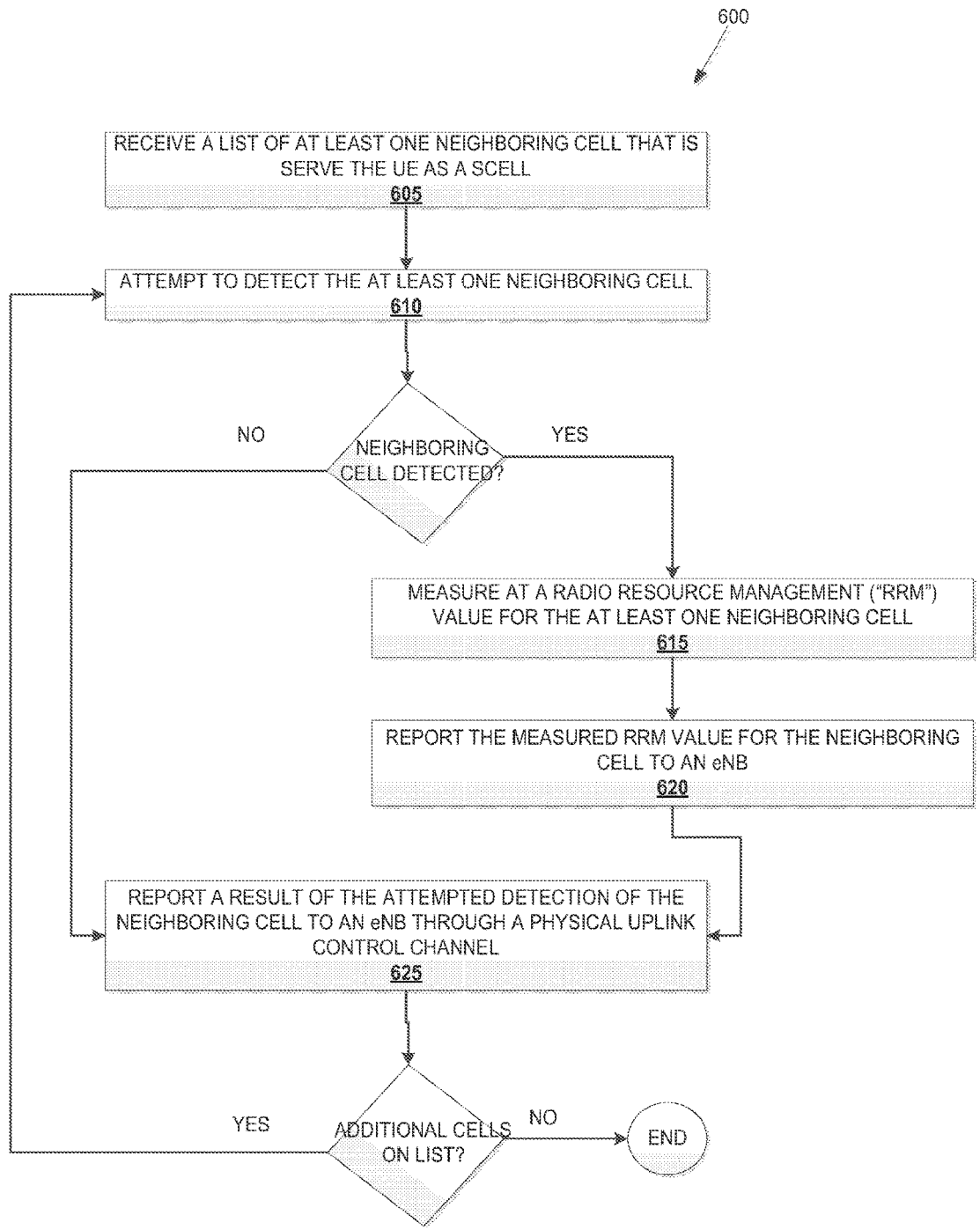
FIG. 6 is a flow diagram is depicting a method for reporting an Radio Resource Management ("RRM") metric value by a UE for a neighboring cell, according to one embodiment.

Turning now to FIG. 6, a flow diagram is shown illustrating a method 600 for reporting an RRM metric value by a UE for a neighboring cell. The method 600 may be performed by a UE, such as the UE 150 in the network 100 shown in FIG. 1. While FIG. 6 illustrates a plurality of sequential operations, one of ordinary skill would understand that one or more operations of the method 600 may be transposed and/or performed contemporaneously. The method 600 may be performed in a wireless network environment by a UE adapted for carrier aggregation to identify a satisfactory SCell that is to serve the UE as a SCell. Accordingly, the UE may already be served by a PCell, such as a PCell provided by an eNB, where the UE performs the method 600. In another embodiment, the method 600 may be performed for handover between cells.

Beginning with operation 605, the UE performing the method 600 is to receive a list of neighboring cells. In one embodiment, the UE is served by an eNB in a carrier aggregation system and the list includes one or more small cells that are suitable to serve the UE as an SCell(s) in the carrier aggregation system. In other embodiments, however, the list includes one or more other cells that are suitable to serve the UE and to which the eNB may hand over the UE. The list may identify the one or more cells by an identifier, such as a PCI and/or a global cell identity.

At operation 610, the UE may attempt to detect a neighboring cell that is enumerated on the received list. For example, the UE may receive one or more physical signals (e.g., synchronization signals) from a neighboring cell(s) that the UE is adapted to match to a cell included in the received list. In one embodiment, the UE is adapted to receive a discovery signal for the neighboring cell so that the UE may detect that neighboring cell. This discovery signal may operate on, for example, a new carrier type ("NCT") and/or a Multicast-Broadcast Single Frequency Network ("MBSFN") subframe. If the discovery signal is transmitted on MBSFN subframe(s), the full backward compatibility can be expected because the legacy UE is not aware of the discovery signals.

Where, the UE detects the cell, the method 600 proceeds to operation 615. At this operation 615, the UE is adapted to measure at least one RRM metric value for the detected cell. For example, the UE may be adapted to measure one or more of SCH_RP, SCH Ês/Iot, RSRP, and/or RSRQ using at least one of a CRS and signals used to determine subframe boundaries (e.g., the PSS and/or SSS). At subsequent operation 620, the UE may report the measured RRM metric value for the neighboring cell to an eNB, such as the eNB that provided the list of neighboring cell(s). The UE may report the measured RRM metric value according to a plurality of triggers, such as an event, after a certain duration, and/or in response to a request from the eNB. In some embodiments, operation 620 is transposed, or occurs contemporaneously, with operation 625, described below.

Irrespective of whether the neighboring cell is detected at operation 610, operation 625 sees the UE report a result of the attempted neighboring cell detection to an eNB. In some embodiments, the UE is to report the result of the attempted neighboring cell detection to the same eNB that provided the UE with the list of neighboring cells. This result may be used to identify and engage cells for carrier aggregation and/or cell handover.

To report the result of the attempted neighboring cell detection, the UE may transmit the result through a Physical Unlink Control Channel ("PUCCH"). The PUCCH is frequently used to transmit a scheduling request ("SR"), e.g., for when the UE requests the eNB to allocate unlink resources for the Physical Uplink Shared Channel. However, the PUCCH may be adopted by a wireless system having the UE and eNB to report whether a cell is detected.

The UE can report the result of the attempted neighboring cell detection using any suitable PUCCH format, such as 1, 1a, 1b, 2, 2a, 2b, and 3. The reporting configuration may reuse the SR configurations. According to some embodiments the embodiment, the UE may include a particular value in a particular resource element of a PUCCH signal. In one exemplary embodiment, the combination of an orthogonal resource $n_{PUCCH}^{(1)}$ and an SR configuration index may correspond to a PCI (or a global cell identity). The SR configuration index may be shown by:

| SR configuration Index $I_{SR}$ | SR periodicity (ms) PERIODICITY | SR subframe offset OFFSET, SR |
|---|---|---|
| 0-4 | 5 | $I_{SR}$ |
| 5-14 | 10 | $I_{SR}$ − 5 |
| 15-34 | 20 | $I_{SR}$ − 15 |
| 35-74 | 40 | $I_{SR}$ − 35 |
| 75-154 | 80 | $I_{SR}$ − 75 |
| 155-156 | 2 | $I_{SR}$ − 155 |
| 157 | 1 | $I_{SR}$ − 157 |

Where the UE detects a particular neighboring cell having a PCI that corresponds to a particular orthogonal resource/SR configuration index pair, the UE may report this successful detection to an eNB using the PUCCH. For example, for a PCI 100, the UE may report the successful detection of this PCI using the SR configuration index of zero (0) and the value 100 in the $n_{PUCCH}^{(1)}$ orthogonal resource. In another embodiment, a particular SR configuration index having a specific periodicity and subframe offset may correspond to a particular neighboring cell (e.g., a "1" in a specific SR configuration index indicates that a cell corresponding to that specific SR configuration index is detected by the UE). These correspondence values and other configuration parameters may be predetermined (e.g., hardcoded) into one or both of the eNB and the UE.

After reporting the result of the attempted cell detection to the eNB, the method 600 may revisit operation 610 to attempt to detect additional cells included in the received list. Alternatively, or if there are no additional cells remaining on the received list, the method 600 may conclude.

Figure 7:
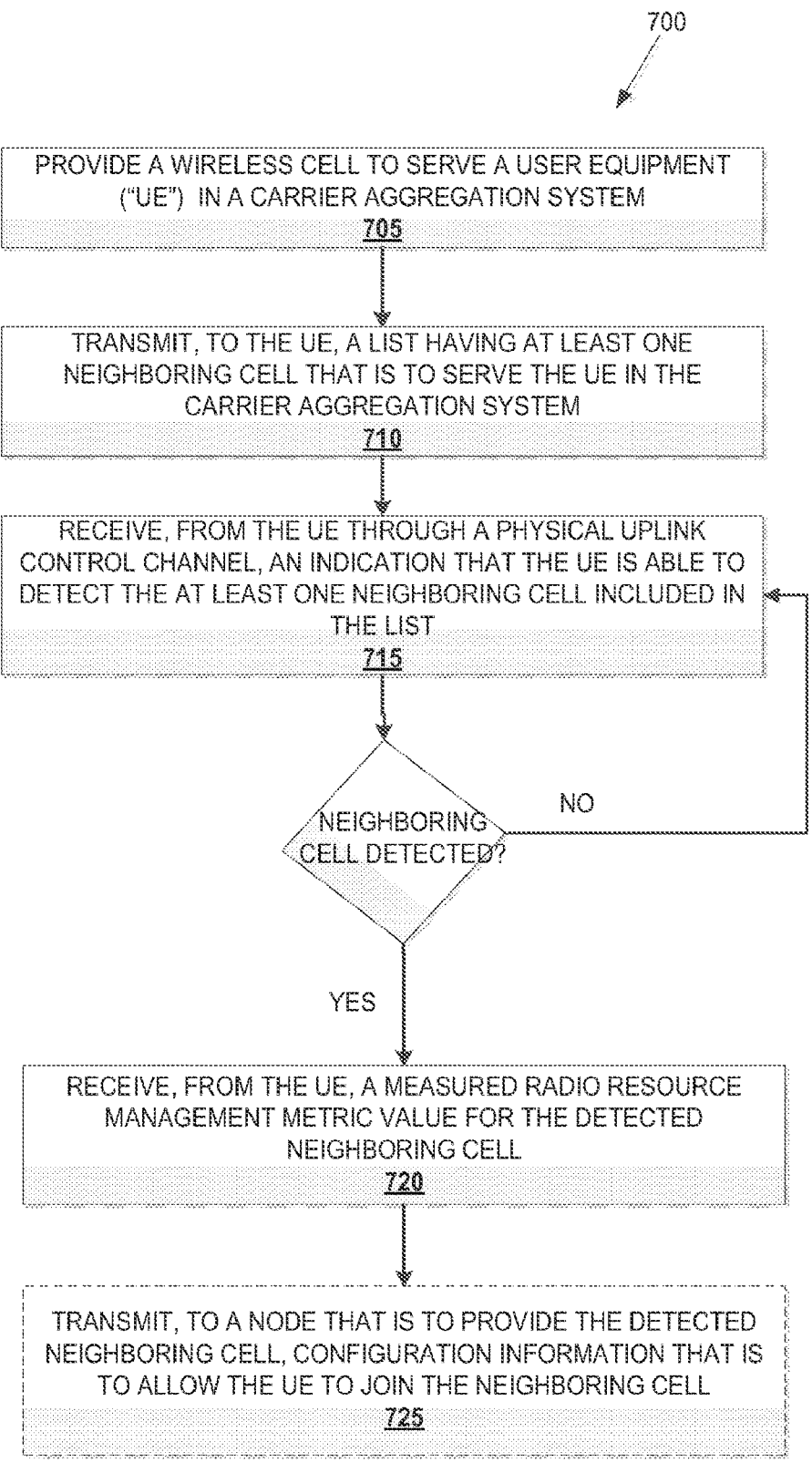
FIG. 7 is a flow diagram depicting a method for radio resource management measurement of neighboring cells, according to one embodiment.

With reference to FIG. 7, a flow diagram depicts a method 700 for radio resource management measurement of neighboring cells. The method 700 may be performed by an eNB, such as the eNB 105 in the network 100 shown in FIG. 1. While FIG. 7 illustrates a plurality of sequential operations, one of ordinary skill would understand that one or more operations of the method 700 may be transposed and/or performed contemporaneously. The method 700 may be performed in a wireless network environment by an eNB serving a UE that is adapted for carrier aggregation. In another embodiment, the method 700 may be performed for handover between cells. The method 700 starts with operation 705, where the eNB is configured to provide a wireless cell that is to serve a UE in a wireless networking environment. For a UE that is adapted for carrier aggregation, the wireless cell provided by the eNB may be a PCell. In one embodiment, the eNB is adapted to administrate handover of the UE to a neighboring cell in the wireless networking environment.

At operation 710, the eNB is to transmit a list of neighboring cells to the UE. Depending upon the embodiment, the eNB may transmit the list of neighboring cells to a specific UE (e.g., using beamforming) or, alternatively, the eNB may transmit the list of neighboring cells to all UE served by the eNB (e.g., using broadcasting). In one embodiment, this list includes cells that are available to serve the UE as SCells for carrier aggregation. These SCells may be within the coverage area of the PCell provided by the eNB. In another embodiment, the list includes neighboring cells to which the eNB may hand over the UE. With the list of neighboring cells, the UE may be responsible for detecting the cells (e.g., to ensure that the UE is within the coverage area provided by one or more neighboring cells) and/or performing RRM measurements related to the neighboring cells.

Continuing to operation 715, the eNB is to receive from the UE (i.e., the UE to which the eNB transmitted the list) an indication of whether the UE is able to detect at least one neighboring cell included in the list. In one embodiment, the eNB is to receive the indication through a PUCCH (e.g., established with the UE). The eNB may receive the indication according to a known PUCCH format, such as 1, 1a, 1b, 2, 2a, 2b, and 3. In one embodiment, the eNB may receive the indication from the UE as a specific value in a specific resource element of a PUCCH signal. For example, the combination of an orthogonal resource $n_{PUCCH}^{(1)}$ and a SR configuration index may correspond to a PCI (or a global cell identity) of a cell that is included in the list of neighboring cells. In another embodiment, a specific SR configuration index having a specific periodicity and subframe offset may correspond to a specific neighboring cell (e.g., a "1" in a specific SR configuration index indicates that a cell corresponding to that specific SR configuration index is detected by the UE). The eNB may have preconfigured therein the correspondence relationships between cell identities and orthogonal resources/SR configuration indices in the PUCCH.

Particularly with lists having a plurality of neighboring cells, the eNB may be adapted to receive a respective indication for each neighboring cell from the UE. If the list of neighboring cells is exhausted and the eNB receives an indication that the UE is unable to detect a remaining cell(s) on the list, the method 700 may terminate. Alternatively, the method 700 may revisit operation 715 where eNB receives an indication that the UE is unable to detect a cell included in the list, but where the list includes additional neighboring cells that are to be detected by the UE and reported to the eNB.

Where the eNB receives an indication from the UE that the UE is able to detect a neighboring cell included in the transmitted list, the eNB may further be adapted to receive at least one RRM measurement for the detected neighboring cell from the UE. For example, the eNB may be adapted to receive from the UE one or more of SCH_RP, SCH Ês/Iot, RSRP, and/or RSRQ corresponding to the neighboring cell detected by the UE. The eNB may receive the RRM metric value as a consequence of at least one trigger, such as an predetermined event or after a certain duration. In one embodiment, the eNB is adapted to request the RRM metric value from the UE in response to an indication that the UE is able to detect a neighboring cell included in the list. Subsequently, the eNB may receive the RRM metric value from the UE in response to the request.

In some embodiments, the eNB is adapted to transmit configuration information to the neighboring cell detected by the UE (as indicated to the eNB by the UE), as illustrated at operation 725. In a carrier aggregation system, this neighboring cell is frequently provided by a low-powered radio access node (e.g., a node 115 of FIG. 1) that is adapted to serve the UE as a SCell. The configuration information transmitted by the eNB to the UE may allow the UE to join the neighboring cell. For example, in some carrier aggregation systems small cells within the coverage of a macro cell provided by the eNB may be centrally managed by the eNB, and therefore the eNB may need to provide configuration information to the low-powered radio access node for consistency and reconciliation during data offloading, handover between small cells, and the like.

Figure 8:
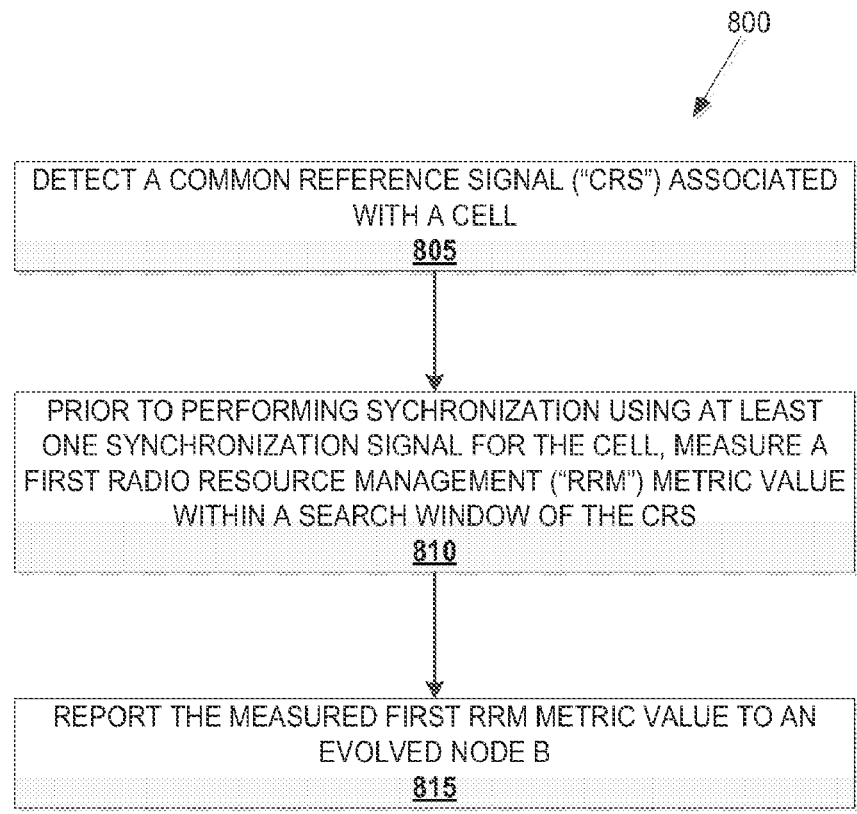
FIG. 8 is a flow diagram depicting a method for radio resource management measurement and reporting from a UE, according to one embodiment.

Now with reference to FIG. 8, a flow diagram depicts a method 800 for radio resource management measurement and reporting from a UE. The method 800 may be performed by a UE, such as the UE 150 in the network 100 shown in FIG. 1. While FIG. 8 illustrates a plurality of sequential operations, one of ordinary skill would understand that one or more operations of the method 800 may be transposed and/or performed contemporaneously. The method 800 may be performed in a wireless network environment by a UE adapted for carrier aggregation to identify a satisfactory small cell that is to serve the UE as a SCell. Accordingly, the UE may already be served by a PCell, such as a PCell provided by an eNB, where the UE performs the method 800. In another embodiment, the method 800 may be performed for handover between cells.

Starting with operation 805, the UE performing the method 800 is adapted to detect a common reference signal ("CRS") associated with a cell (e.g., a macro cell or a small cell). The CRS may be broadcast by the cell in the downlink direction. Where the UE is within the coverage area of the cell, the UE may scan the frequency spectrum and tune transceiver circuitry of the UE to a frequency (or band) at which a plurality of radio frames are being transmitted. At that frequency, the UE may examine a physical signal of a radio frame transmitted by the cell to determine the CRS.

Proceeding to operation 810, the UE performs at least one measurement of a metric value. This measurement is to be performed for radio resource management ("RRM") so that radio transmission characteristics of the cell transmitting the CRS can be observed. The RRM metric value measured using the CRS may be measured at an antenna connector of the UE and may be related to one or both of signal power and signal quality. In one embodiment, the RRM metric is defined as the RSRP. In another embodiment, the RRM metric is defined as the RSRQ. In one embodiment, both the RSRP and the RSRQ are measured by the UE. To accelerate cell detection and RRM measurements, as well as to conserve resources of the UE (e.g., power consumption), the UE may measure the RRM metric value from the CRS before performing synchronization with the cell. Thus, although the PSS and SSS may be present in a signal(s) detected by the UE, the UE may not necessarily perform frame (or sub-frame) synchronization using the synchronization signal(s). Accordingly, the UE may conserve resources by avoiding cell synchronization where, for example, a measured RRM metric value does not reach a predetermined threshold.

To measure a RRM metric value, the UE may sample a search window that is not equal to a single radio frame. Rather, the UE may base a RRM metric value measurement on one or more subframes having one or more resource blocks that carry the CRS. Alternatively, the UE may use a larger sample by expanding the search window to include a plurality of radio frames—i.e., the UE may measure a RRM metric value from the CRS detected in the resource blocks across multiple radio frames transmitted by the same cell. At next operation 815, the UE is adapted to transmit a measured RRM metric value. The UE may report one or more measure RRM metric value(s) to an eNB that is serving the UE. In one embodiment, the UE is adapted to transmit the measured RRM metric value where the cell associated with the detected CRS is suitable to serve the UE (e.g., where the measured RRM metric value exceeds a threshold). In another embodiment, the UE is adapted to transmit the RRM metric value in response to a request from the eNB.

Figure 9:
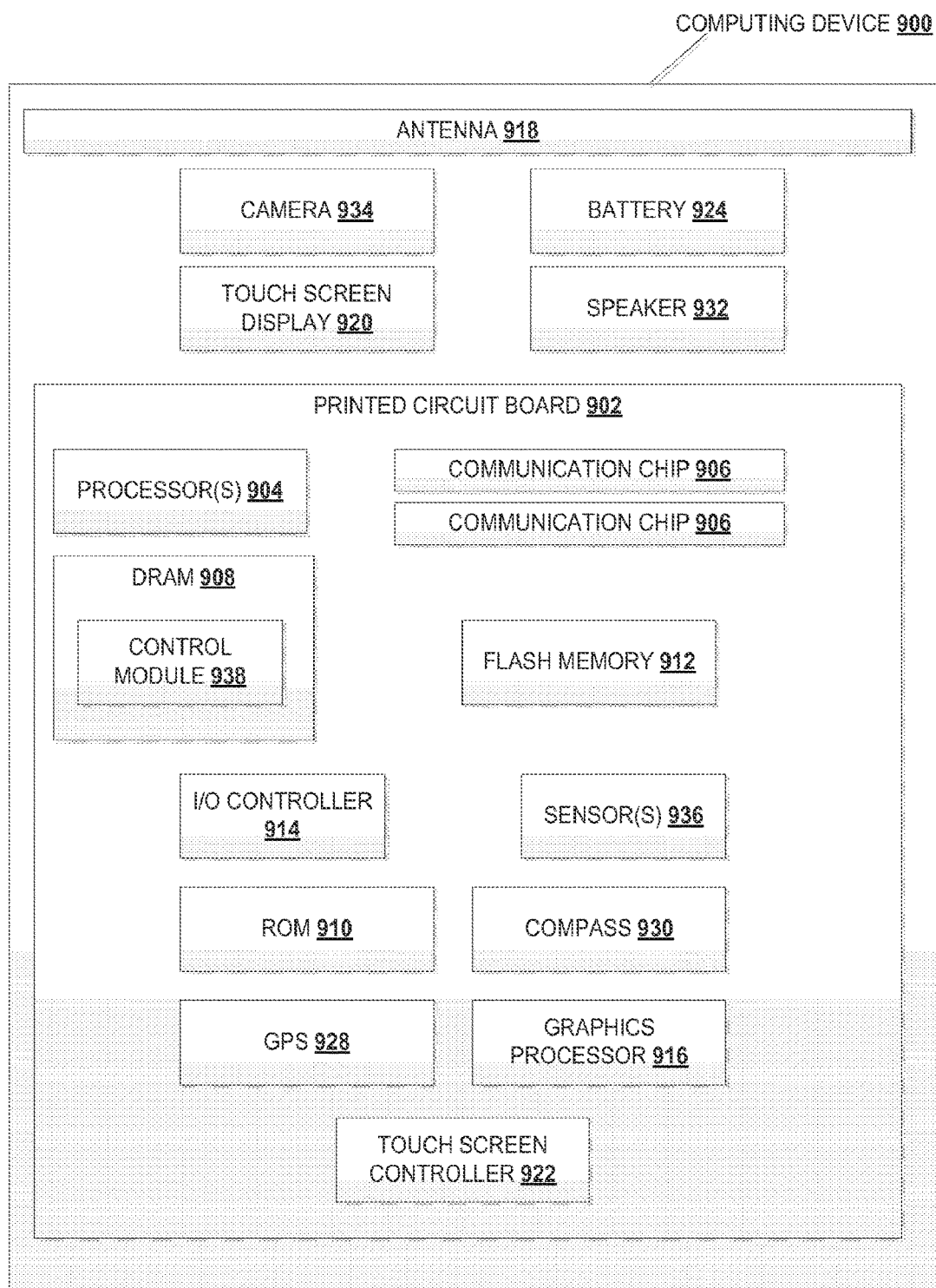
FIG. 9 is a block diagram of a computing device adapted to operate in a wireless communication network, according to one embodiment.

With respect to FIG. 9, a block diagram illustrates an example computing device 900, in accordance with various embodiments. The eNB 105, low-powered radio access node 115, and/or UE 150 of FIG. 1 and described herein may be implemented on a computing device such as computing device 900. The computing device 900 may include a number of components, one or more processor 904 and at least one communication chips 906. Depending upon the embodiment, one or more of the enumerated components may comprise "circuitry" of the computing device 900, such as processing circuitry, measurement circuitry, reporting circuitry, transceiver circuitry, and the like. In various embodiments, the one or more processor(s) 904 each may be a processor core. In various embodiments, the at least one communication chips 906 may be physically and electrically coupled with the one or more processor 904. In further implementations, the communication chips 906 may be part of the one or more processor 904. In various embodiments, the computing device 900 may include a printed circuit board ("PCB") 902. For these embodiments, the one or more processors 904 and communication chip 906 may be disposed thereon. In alternate embodiments, the various components may be coupled without the employment of the PCB 902.

Depending upon its applications, the computing device 900 may include other components that may or may not be physically and electrically coupled with the PCB 902. These other components include, but are not limited to, volatile memory (e.g., dynamic random access memory 908, also referred to as "DRAM"), non-volatile memory (e.g., read only memory 910, also referred to as "ROM"), flash memory 912, an input/output controller 914, a digital signal processor (not shown), a crypto processor (not shown), a graphics processor 916, one or more antenna(s) 918, a display (not shown), a touch screen display 920, a touch screen controller 922, a battery 924, an audio codec (not shown), a video code (not shown), a global positioning system ("GPS") or other satellite navigation device 928, a compass 930, an accelerometer (not shown), a gyroscope (not shown), a speaker 932, a camera 934, one or more sensors 936 (e.g., a barometer, Geiger counter, thermometer, viscometer, rheometer, altimeter, or other sensor that may be found in various manufacturing environments or used in other applications), a mass storage device (e.g., a hard disk drive, s solid state drive, compact disk and drive, digital versatile disk and drive, etc.) (not shown), and the like. In various embodiments, the processor 904 may be integrated on the same die with other components to form a system on a chip ("SOC").

In various embodiments, volatile memory (e.g., DRAM 908), non-volatile memory (e.g., ROM 910), flash memory 912, and the mass storage device (not shown) may include programming instructions configured to enable the computing device 900, in response to the execution by one or more process 904, to practice all or selected aspects of the data exchanges and methods described herein, depending on the embodiment of the computing device 900 used to implement such data exchanges and methods. More specifically, one or more of the memory components (e.g., DRAM 908, ROM 910, flash memory 912, and the mass storage device) may include temporal and/or persistent copies of instructions that, when executed by one or more processors 904, enable the computing device 900 to operate one or more modules 938 configured to practice all or selected aspects of the data exchanges and method described herein, depending on the embodiment of the computing device 900 used to implement such data exchanges and methods.

The communication chips 906 may enable wired and/or wireless communications for the transfer of data to and from the computing device 900. The term "wireless" and its derivatives may be used to describe circuits, devices, systems, methods, techniques, communication channels, etc., that may communicate data through the use of modulated electromagnetic radiation through a non-solid medium. The term does not imply that the associated devices do not contain any wires, although in some embodiments they might not. The communication chips 906 may implement any of a number of wireless standards or protocols, including but not limited to Long Term Evolution ("LTE"), LTE Advanced ("LTE-A"), Institute of Electrical and Electronics Engineers ("IEEE") 702.20, General Packet Radio Service ("GPRS"), Evolution Data Optimized ("Ev-DO"), Evolved High Speed Packet Access ("HSPA+"), Evolved High Speed Downlink Packet Access ("HSDPA+"), Evolved High Speed Uplink Packet Access ("HSUPA+"), Global System for Mobile Communications ("GSM"), Enhanced Data Rates for GSM Evolution ("EDGE"), Code Division Multiple Access ("CDMA"), Time Division Multiple Access ("TDMA"), Digital Enhanced Cordless Telecommunications ("DECT"), Bluetooth, derivatives thereof, as well as other wireless protocols that are designated as 3G, 4G, 5G, and beyond. The computing device 900 may include a plurality of communication chips 906 adapted to perform different communication functions. For example, a first communication chip 906 may be dedicated to shorter range wireless communications, such as Wi-Fi and Bluetooth, whereas a second communication chip 906 may be dedicated to longer range wireless communications, such as GPS, EDGE, GPRS, CDMA, WiMAX, LTE, LTE-A, Ev-DO, and the like.

In various implementations, the computing device 900 may be a laptop, netbook, a notebook computer, an ultrabook computer, a smart phone, a computing tablet, a personal digital assistant ("PDA"), an ultra mobile personal computer, a mobile phone, a desktop computer, a server, a printer, a scanner, a monitor, a set-top box, an entertainment control unit (e.g., a gaming console), a digital camera, a portable digital media player, a digital video recorder, and the like. In further embodiments, the computing device 900 may be another other electronic device that processes data.

In some embodiments, example 1 includes an apparatus to be included in a UE may detect a first synchronization signal for identifying a cell. The apparatus of example 1 may measure a RRM metric value for the cell using the first synchronization signal. Further, the apparatus of example 1 may report the measured first RRM metric value for the cell to an eNB. In example 2, the apparatus of example 1 may detect a second synchronization signal used for identifying the cell, the measurement circuitry is further to measure a second RRM metric value for the cell using the second synchronization signal, and the reporting circuitry is further to report the measured second RRM metric value to the eNB. In example 3 includes the apparatus of example 2 and the first synchronization signal is a primary synchronization signal and the second synchronization signal is a secondary synchronization signal. In example 4, the apparatus of any of examples 2-3 may identify a physical layer cell identity of the cell using the first and second synchronization signals. Example 5 includes the apparatus of example 2 and the second RRM metric is a signal to interference over thermal noise power on the second synchronization signal. Example 6 includes the apparatus of any of examples 1-3 and the first RRM metric is a received average power of a resource element that carries the first synchronization signal. In example 7, the apparatus of example 1 may receive a list of neighboring cells, including the cell that is identifiable by the apparatus according to the first synchronization signal.

In some embodiments of example 8, an apparatus to be included in an eNB may provide a wireless primary cell ("PCell") that is to serve a UE in a carrier aggregation ("CA") system and may determine a RRM metric that is to be measured by the UE based on a signal that is to be received by the UE and is transmitted to the UE by a secondary cell ("SCell") that is to serve the UE. The apparatus of example 8 may provide the determined RRM metric to the UE. Example 9 includes the apparatus of example 8 and the determined RRM metric is one of a received average power of a resource element that carries a first synchronization signal and a signal to interference over thermal noise power on a second synchronization signal. In example 10, the apparatus of any of examples 8-9 may determine a threshold for the determined RRM metric, and the transceiver circuitry is further to provide the determined threshold to the UE. In example 11, the apparatus of example 10 may receive, from the UE, a cell identity for a cell having a value measured by the UE for the determined RRM metric that exceeds the determined threshold and further may request, from the UE and in response to receiving the cell identity, the value measured by the UE for the determined RRM metric. In example 12, the apparatus of any of examples 8-9 may determine the RRM metric based on at least one of a carrier frequency and a cell identity.

In some embodiments of example 13, an apparatus to be included in a UE may receive, from a wireless primary cell provided by an eNB and serving the UE, a list including at least one neighboring cell that is to serve the UE as a secondary cell. The apparatus of example 13 may detect the at least one neighboring cell and measure a Radio Resource Management ("RRM") value for the at least one neighboring cell where the at least one neighboring cell is detected by the apparatus. The apparatus of example 13 may report a result to the eNB that is to indicate whether the UE is able to detect the at least one neighboring cell, and may provide the measured RRM metric value to the eNB where the at least one neighboring cell is detected. In example 14, the apparatus of example 13 may report the result through a Physical Uplink Control Channel ("PUCCH"). Example 15 includes the apparatus of example 14 and the PUCCH is one of format 1, 1a, and 1b and the result is to indicate whether the apparatus is able to detect the at least one neighboring cell by including a predetermined value in a predetermined resource element that corresponds to the at least one neighboring cell. Example 16 includes the apparatus of example 14, the PUCCH is one of format 2, 2a, 2b, and 3 and the result is to indicate whether the apparatus is able to detect the at least one neighboring cell by including a cell identity of the at least one neighboring cell. In example 17, the apparatus of any of examples 13-16 may provide the measured RRM metric value to the eNB in response to receiving a request from the eNB. In example 18, the apparatus of any of examples 13-16 may measure the RRM metric value for the at least one neighboring cell using a received signal that is suitable for determining subframe boundaries.

In some embodiments of example 19, an apparatus that is to be included in an eNB may provide a wireless primary cell that is to be detected by a UE in a CA system. The apparatus of example 19 may transmit a list having at least one neighboring cell that is to serve the UE as a secondary cell in the CA system, and may receive an indication that the UE is able to detect the at least one neighboring cell from the UE through a PUCCH. Example 20 includes the apparatus of example 19 and the primary cell is a macro cell having a coverage area that is greater than that of the secondary cell. In example 21, the apparatus of any of examples 19-20 may transmit, to the UE, a request for a RRM measurement associated with the at least one neighboring cell, in response to an indication that the UE is able to detect the at least one neighboring cell. In example 22, the apparatus of any of examples 19-20 may transmit, to a low-power node that is to provide the neighboring cell, configuration information to allow the UE to join the at least one neighboring cell, in response to an indication that the UE is able to detect the at least one neighboring cell.

In some embodiments of example 23, an apparatus that is to be included in a UE may detect a common reference signal ("CRS") associated with a cell. The apparatus may measure a first RRM metric value for the cell using the CRS prior to performing cell synchronization with the cell using at least one synchronization signal transmitted from the cell. The apparatus may report the measured first RRM metric value for the cell to an eNB. Example 24 includes the apparatus of example 23 and the RRM metric is one of a reference signal received power ("RSRP)" and a reference signal received quality ("RSRQ"). In example 25, the apparatus of any of examples 23-24 may measure the first RRM metric value within a search window of the CRS, the search window to be one of at least one subframe of a radio frame and a plurality of radio frames.

In some embodiments of example 26, a computer-implemented method for performing Radio Resource Management ("RRM") operations comprises the operations of detecting, by circuitry included in a user equipment ("UE"), a first synchronization signal for identifying a cell; measuring, by the circuitry included in the UE, a first RRM metric value for the cell based on the first synchronization signal; and reporting, by the circuitry included in the UE, the measured first RRM metric value to an evolved Node B ("eNB"). Example 27 includes the method of example 26, as well as the operations of detecting, by the circuitry included in a user equipment ("UE"), a second synchronization signal for identifying the cell; measuring, by the circuitry included in the UE, a second RRM metric value for the cell based on the second synchronization signal; and reporting, by the circuitry included in the UE, the measured second RRM metric value to the eNB. Example 28 includes the method of example 27, as well as the operation of identifying, by the circuitry included in the UE, a physical layer cell identity of the cell based on the first and second synchronization signals. Example 29 includes the method of any of examples 26-28, and the first RRM metric value is a received average power of a resource element that carries the first synchronization signal value.

In some embodiments of example 30, an apparatus to be included in a UE comprises means for detecting a first synchronization signal for identifying a cell; means for measuring a first RRM metric value for the cell based on the first synchronization signal; and means for reporting the measured first RRM metric value to an evolved Node B ("eNB"). Example 31 includes the apparatus of example 30, and the detecting means is further for detecting a second synchronization signal for identifying the cell, the measuring means is further for measuring a second RRM metric value for the cell based on the second synchronization signal, and the reporting means is further for reporting the measured second RRM metric value to the eNB. Example 32 includes the apparatus of example 30, further comprising means for identifying a physical layer cell identity of the cell based on the first and second synchronization signals, and the reporting means is further for reporting the physical layer cell identity to the eNB.

In some embodiments of example 33, a system to be included in an evolved Node B ("eNB") for Radio Resource Management ("RRM") observation comprises: at least one processor; and at least one memory having processor-executable instructions that, in response to execution by the at least one processor, cause the system to: provide a wireless primary cell ("PCell") that is to serve a user equipment ("UE") in a carrier aggregation system; determine an RRM metric that is to be measured by the UE based on a signal that is to be received by the UE and is transmitted to the UE by a secondary cell ("SCell") that is to serve the UE; and transmit the determined RRM metric to the UE. Example 34 includes the system of example 33, the instructions further to cause the system to determine a threshold for the determined RRM metric; and transmit the determined threshold to the UE. Example 35 includes the system of any of examples 33-34, wherein the determined RRM metric is one of a received average power of a resource element that carries a first synchronization signal and a signal to interference over thermal noise power on a second synchronization signal.

In some embodiments of example 36, a non-transitory computing device-readable medium comprises computing device-executable instructions for measuring Radio Resource Management ("RRM") metric values in a wireless network, wherein the instructions, in response to execution by a computing device, cause the computing device to: receive, from a wireless primary cell ("PCell") provided by an evolved Node B ("eNB") to serve the UE, a list that includes at least one neighboring cell that is to serve the UE as a secondary cell ("SCell"); attempt to detect the at least one neighboring cell;

report a result to the eNB that is to indicate whether the attempt to detect the at least neighboring cell is successful; and where the attempt to detect the at least one neighboring cell is successful: measure an RRM metric value for the at least one neighboring cell; and transmit the measured RRM metric value to the eNB. Example 37 includes the non-transitory computing device-readable medium of example 36, wherein the instructions cause the computing device to report the result through a Physical Uplink Control Channel ("PUCCH"). Example 38 includes the non-transitory computing device-readable medium of any of examples 36-37, wherein the instructions cause the computing device to measure the RRM metric value for the at least one neighboring cell using a received signal that is suitable for determining subframe boundaries.

In some embodiments of example 39, a non-transitory computing device-readable medium comprises computing device-executable instructions for observing Radio Resource Management ("RRM") metric values in a wireless network, wherein the instructions, in response to execution by a computing device, cause the computing device to: provide a wireless primary cell ("PCell") that is to be detected by a user equipment ("UE") in a carrier aggregation ("CA") system; transmit a list having at least one neighboring cell that is to serve the UE as a secondary cell ("SCell") in the CA system; and receive an indication that the UE is able to detect the at least one neighboring cell from the UE through a Physical Uplink Control Channel ("PUCCH"). Example 40 includes the non-transitory computing device-readable medium of claim 39, wherein the instructions further cause the computing device to transmit, to a low-power node that is to provide the neighboring cell, configuration information to allow the UE to join the at least one neighboring cell, in response to an indication that the UE is able to detect the at least one neighboring cell.

Some portions of the preceding detailed description have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein also relate to an apparatus for performing the aforementioned operations. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures can be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described can be performed in a different order. Moreover, some operations can be performed in parallel rather than sequentially.

Embodiments illustrated herein are not described with reference to any particular programming language. It will be appreciated that a variety of programming languages can be used to implement the teachings of embodiments described herein.

In the foregoing Specification, embodiments have been described with reference to specific exemplary embodiments thereof. It will be evident that various modifications can be made thereto without departing from the broader spirit and scope of the subject matter as set forth in the following claims. The Specification and drawings are, accordingly, to be regarded in an illustrative sense rather than a restrictive sense.

What is claimed is:

1. An apparatus to be implemented in a user equipment ("UE"), the apparatus comprising:
    processing circuitry to:
        identify, based on a message received from an evolved node B ("eNB"), an indication of a first Radio Resource Management ("RRM") metric and a second RRM metric, wherein the first RRM metric is for measurement of a first carrier frequency of a first cell and the second RRM metric is for measurement of a second carrier frequency of a second cell, wherein the first RRM metric is different than the second RRM metric,
        detect a first synchronization signal for identifying the first cell and a second synchronization signal for identifying the second cell, and
        identify a first physical layer cell identity ("PCI") of the first cell using the first synchronization signal and a second PCI of the second cell using the second synchronization signal;
    measurement circuitry, communicatively coupled with the processing circuitry, the measurement circuitry to:
        measure, using the first RRM metric, a first RRM metric value of a resource element carrying the first synchronization signal, wherein the first RRM metric value of the resource element carrying the first synchronization signal is for channel estimation or cell selection, and
        measure, using the second RRM metric, a second RRM metric value of a resource element carrying the second synchronization signal, wherein the second RRM metric value of the resource element carrying the second synchronization signal is for channel estimation or cell selection; and
    reporting circuitry, communicatively coupled with the measurement circuitry, the reporting circuitry to report the first PCI and the measured first RRM metric value for the first cell or the second PCI and the measured second RRM metric value for the second cell to the eNB.

2. The apparatus of claim 1, wherein the first synchronization signal is a primary synchronization signal or a secondary synchronization signal provided by the first cell and the second synchronization signal is a primary synchronization signal or a secondary synchronization signal provided by the second cell.

3. The apparatus of claim 1, wherein the reporting circuitry is further to transmit the report at a predetermined interval.

4. The apparatus of claim 1, wherein the first RRM metric and the second RRM metric are ones among a plurality of RRM metrics, and the plurality of RRM metrics include a received linear average power, an interference over thermal noise power, a reference signal received power ("RSRP"), and a reference signal received quality ("RSRQ"), and wherein the second RRM metric value is a signal to interference over thermal noise power of the second synchronization signal.

5. The apparatus of claim 1, wherein the eNB operates a primary cell that serves the UE; the first cell is a secondary cell, another primary cell operated by another eNB, or a secondary cell operated by a small cell base station; the second cell is another secondary cell operated by another small cell base station; and the first carrier frequency is different than the second carrier frequency.

6. The apparatus of claim 1, wherein the processing circuitry is further to receive, from the eNB, a list of neighboring cells that includes the first cell and the second cell.

7. The apparatus of claim 1, wherein:
    the processing circuitry is further to:
        identify, based on the message, a first threshold to which the first RRM metric value is to be compared and a second threshold to which the second RRM metric value is to be compared, and determine whether the measured first RRM metric value exceeds the first threshold and whether the measured second RRM metric value exceeds the second threshold; and the reporting circuitry is to report the first PCI and the measured first RRM metric value for the first cell to the eNB when the first RRM metric value is determined to exceed the first threshold or report the second PCI and the measured second RRM metric value for the second cell when the second RRM metric value is determined to exceed the second threshold.

8. The apparatus of claim 1, wherein
the processing circuitry is further to receive, from the eNB, a request for the first RRM metric value or the second RRM metric value; and wherein the reporting circuitry is to report the first RRM metric value or the second RRM metric value according to the request.

9. One or more non-transitory computer-readable media including instructions, wherein execution of the instructions by one or more processors of a user equipment ("UE") causes the UE to:

identify, based on a message received from an evolved node B ("eNB"), a first Radio Resource Management ("RRM") metric and a second RRM metric, wherein the first RRM metric is for measurement of a first carrier frequency of a first cell and the second RRM metric is for measurement of a second carrier frequency of a second cell, wherein the first RRM metric is different than the second RRM metric;

detect a first primary synchronization signal ("PSS") or a first secondary synchronization signal ("SSS") of the first cell for identifying the first cell;

detect a second PSS or a second SSS of the second cell for identifying the second cell;

identify a first physical layer cell identity ("PCI") of the first cell using the first PSS or the first SSS;

identify a second PCI of the second cell using the second PSS or the second SSS;

control measurement, using the first RRM metric, of a resource element carrying the first PSS or the first SSS to obtain a first RRM metric value, wherein the first RRM metric value of the resource element carrying the first PSS or the first SSS is for channel estimation or cell selection;

control measurement, using the second RRM metric, of a resource element carrying the second PSS or the second SSS to obtain a second RRM metric value, wherein the second RRM metric value of the resource element carrying the second PSS or the second SSS is for channel estimation or cell selection; and transmit, to the eNB, a report including the first PCI and the measured first RRM metric value or the second PCI and the measured second RRM metric value.

10. The one or more non-transitory computer-readable media of claim 9, wherein the first RRM metric and the second RRM metric are among a plurality of RRM metrics, and the plurality of RRM metrics include a received linear average power, an interference over thermal noise power, a reference signal received power ("RSRP"), and a reference signal received quality ("RSRQ").

11. The one or more non-transitory computer-readable media of claim 9, wherein:

the eNB operates a primary cell that serves the UE,
the first cell is a secondary cell or another primary cell operated by another eNB or a secondary cell operated by a small cell base station,
the second cell is another secondary cell operated by another small cell base station, and
the first carrier frequency is different than the second carrier frequency.

12. The one or more non-transitory computer-readable media of claim 9, wherein execution of the instructions causes the UE to:
identify, based on the message, a list of neighboring cells that includes the first cell and the second cell.

13. The one or more non-transitory computer-readable media of claim 9, wherein execution of the instructions causes the UE to:
identify, based on the message, a first threshold to which the first RRM metric value is to be compared or a second threshold to which the second RRM metric value is to be compared; and
determine whether the measured first RRM metric value exceeds the first threshold or whether the measured second RRM metric value exceeds the second threshold; and,
wherein, to transmit the report to the eNB, execution of the instructions causes the UE to transmit the report when the first RRM metric value exceeds the first threshold or when the second RRM metric value exceeds the second threshold.

14. The one or more non-transitory computer-readable media of claim 9, wherein to transmit the report to the eNB, execution of the instructions causes the UE to:
transmit the report at a predetermined interval.

15. An apparatus to be implemented in an evolved Node B ("eNB"), the apparatus comprising:
processing circuitry to:
select a first Radio Resource Management ("RRM") metric for measurement of a primary synchronization signal ("PSS") and a second RRM metric for measurement of a secondary synchronization signal ("SSS"), wherein the first RRM metric and the second RRM metric are selected from among a plurality of RRM metrics based on a frequency carrier to be measured or based on a cell from which a signal is to be measured, and
identify, based on a report from a user equipment ("UE"), a first RRM metric value and a second RRM metric value, wherein the first RRM metric value is based on a measurement of a resource element carrying the PSS using the first RRM metric and the second RRM metric value is based on a measurement of a resource element carrying the SSS using the second RRM metric; and
transceiver circuitry to transmit, to the UE, a message to indicate the first RRM metric and the second RRM metric, and receive, from the UE, the report in response to the message.

16. The apparatus of claim 15, wherein the plurality of RRM metrics include a received linear average power, an interference over thermal noise power, a reference signal received power, and a reference signal received quality.

17. The apparatus of claim 15, wherein the eNB is a primary cell serving the UE, and wherein the processing circuitry is to:

identify, based on the report, a physical layer cell identity; and select, based on the first RRM metric value or the second RRM metric value, a cell associated with the physical layer cell identity to serve the UE as a secondary cell.

18. The apparatus of claim 15, wherein:

the message is to further indicate a first threshold to which the first RRM metric value is to be compared or a second threshold to which the second RRM metric value is to be compared, and the transceiver circuitry is to receive the report when the measured first RRM metric value exceeds the first threshold or when the measured second RRM metric value exceeds the second threshold.

19. The apparatus of claim 15, wherein the message is to further indicate that the UE is to send the report at a predetermined interval.

\* \* \* \* \*